US012157211B2

(12) United States Patent
Yu et al.

(10) Patent No.: US 12,157,211 B2
(45) Date of Patent: Dec. 3, 2024

(54) ADJUSTABLE PLIERS WITH LEVER TYPE POSITIONING DEVICE

(71) Applicant: Tytool Enterprise Co., Ltd., Taichung (TW)

(72) Inventors: Chin-Lung Yu, Taichung (TW); Fang-Chih Lee, Taichung (TW)

(73) Assignee: TYTOOL ENTERPRISE CO., LTD., Taichung (TW)

( * ) Notice: Subject to any disclaimer, the term of this patent is extended or adjusted under 35 U.S.C. 154(b) by 298 days.

(21) Appl. No.: 17/850,176

(22) Filed: Jun. 27, 2022

(65) Prior Publication Data

US 2023/0226666 A1 Jul. 20, 2023

(30) Foreign Application Priority Data

Jan. 19, 2022 (TW) ................................ 111102235

(51) Int. Cl.
*B25B 7/10* (2006.01)
*B25B 7/12* (2006.01)

(52) U.S. Cl.
CPC ................ *B25B 7/10* (2013.01); *B25B 7/123* (2013.01)

(58) Field of Classification Search
CPC ........... B25B 7/10; B25B 7/123; B25B 13/14; B25B 13/22
USPC .................................. 81/357, 358, 367, 405
See application file for complete search history.

(56) References Cited

U.S. PATENT DOCUMENTS 3,210,844 A * 10/1965 Tontscheff ........... B23D 29/023 81/358
6,199,459 B1 * 3/2001 Azkona ..................... B25B 7/10 81/413
9,592,589 B2 * 3/2017 Wang ........................ B25B 7/10
2019/0224817 A1 7/2019 Wu

* cited by examiner

*Primary Examiner* — Hadi Shakeri
(74) *Attorney, Agent, or Firm* — MUNCY, GEISSLER, OLDS & LOWE, P.C.

(57) ABSTRACT

A pair of adjustable pliers with lever type positioning device includes a clamp body, a first handle slidably engaged with the clamp body, a second handle, and a lever type positioning device. The first handle includes an adjustment tooth. The lever type positioning device pivotally combines the second handle with the first handle, so that the second handle and the clamp body are linked. The lever type positioning device includes a lever member and a positioning member. The lever member pivots between a locked position and a release position. The positioning member is combined with the lever member and includes a positioning tooth. At the locked position, the positioning tooth is engaged with the adjustment tooth. At the release position, the positioning member is disengaged from the adjustment tooth, thereby adjusting the opening degree between the clamp body and the first handle.

9 Claims, 9 Drawing Sheets

100

ADJUSTABLE PLIERS WITH LEVER TYPE POSITIONING DEVICE

BACKGROUND OF THE INVENTION

1. Field of the Invention

The present invention relates to adjustable pliers, and more particularly, to a kind of adjustable pliers with lever type positioning device.

2. Description of the Related Art

Referring to U.S. Pat. No. 15,875,798, a kind of pipe pliers is disclosed, comprising a first plier body, a driving handle, and a clamping member. The driving handle and the first plier body are pivotally disposed on a pivot portion, which is slidably disposed in two guiding toothed grooves of the first plier body. To adjust the clamping width between the first plier body and the clamping member, the pivot portion is pressed, so that the pivot button moves to the release position, whereby the position limiting toothed portion of the pivot button is detached with respect to the two guiding toothed grooves, such that the driving handle is allowed to slide with respect to the first plier body for adjusting the clamping width.

However, during adjustment of such pipe pliers, the user needs to continuously press the pivot button, which fails to meet the convenience of usage.

SUMMARY OF THE INVENTION

To improve the issues above, the present invention discloses a pair of adjustable pliers with lever type positioning device. The user is able to turn the lever member to adjust the opening distance of the pliers. During the adjustment, the user does not need to keep the finger on the lever member, such that the convenience of usage is facilitated.

For achieving the aforementioned objectives, an embodiment of the present invention provides a pair of adjustable pliers with lever type positioning device, comprising a clamp body, a first handle, a second handle, and a lever positioning device. The clamp body comprises a first clamp part disposed on one side thereof, and a slide groove disposed on another side thereof. The first handle comprises a first handgrip part on one end thereof, and a second clamp part on another end thereof, with a connection part disposed between the first handgrip part and the second clamp part. The connection part comprises an adjustment tooth and a movement groove. The connection part is combined with the slide groove and slidable with respect to the slide groove, such that the first clamp part and the second clamp part open and close with respect to each other. The second handle comprises a second handgrip part on one end thereof, and a combination part on another end thereof. The lever positioning device pivotally combines the combination part of the second handle on the connection part along a pivot axis, so that the second handle and the clamp body are linked. The lever positioning device comprises a lever member and a positioning member. The lever member is disposed in the movement groove, and rotates with respect to the first handle about the pivot axis between a locked position and a release position. The positioning member is combined with the lever member, and comprises a positioning tooth. At the locked position, the positioning tooth of the positioning member is kept engaged with the adjustment tooth. At the release position, the lever member moves the positioning member along the pivot axis, such that the positioning tooth is disengaged from the adjustment tooth, facilitating the adjustment of the opening degree between the first clamp part and the second clamp part.

With such configuration, when the lever member of the present invention is turned to the release position, the opening distance between the first clamp part and the second clamp part is adjustable. Also, during the adjustment, the user does not need to keep the finger on the lever member. After the adjustment, the user only needs to turn the lever member back to the locked position, and the opening distance between the first clamp part and the second part is fixed. Thus, the convenience of usage is facilitated.

DETAILED DESCRIPTION OF THE INVENTION

Figure 1:
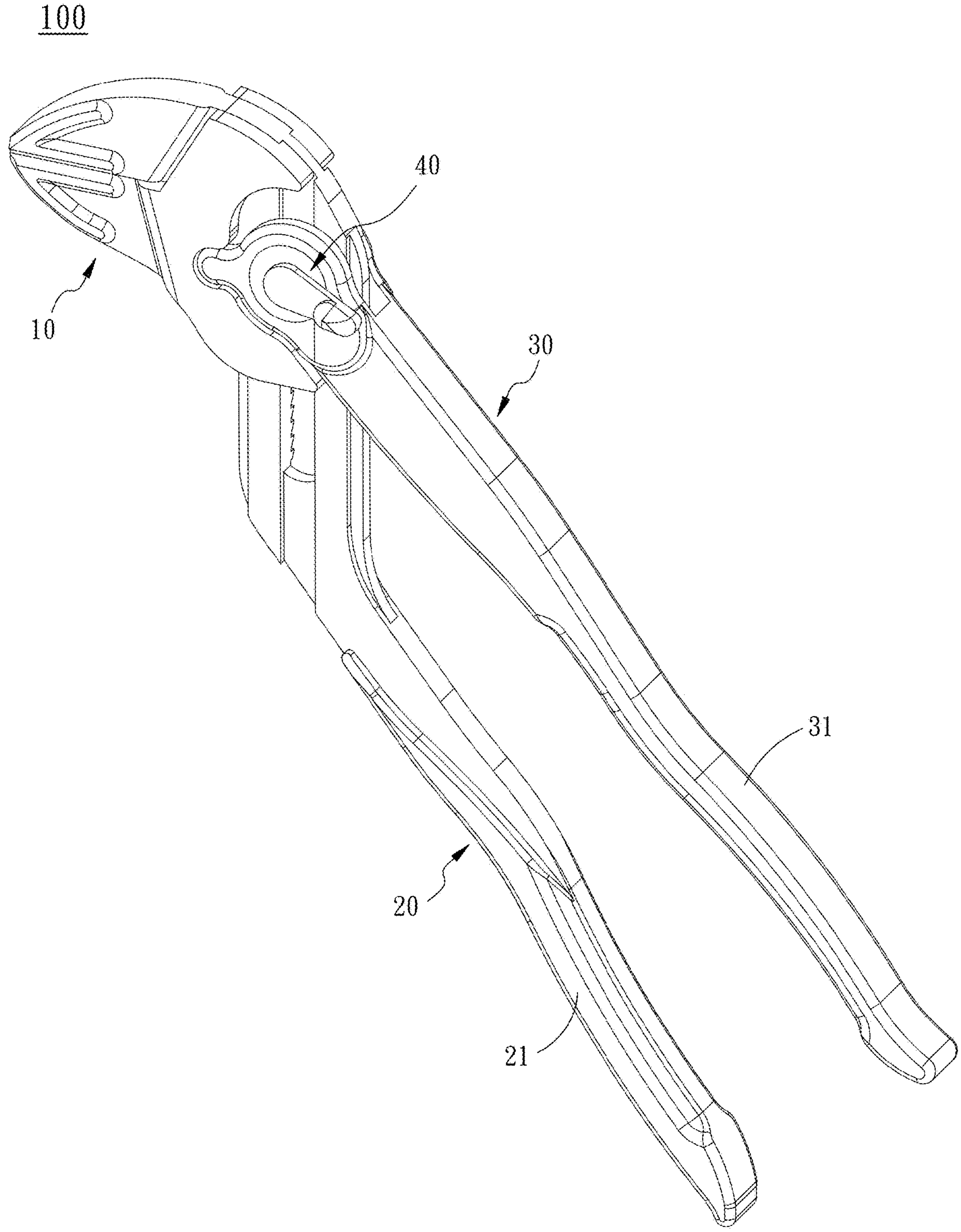
FIG. 1 is a perspective view of adjustable pliers with lever type positioning device in accordance with an embodiment of the present invention.

Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Referring to FIG. 1 to FIG. 9, the present invention provides a pair of adjustable pliers with lever type positioning device 100, comprising a clamp body 10, a first handle 20, a second handle 30, and a lever positioning device 40.

The clamp body 10 comprises a first clamp part 11 on one side thereof, and an engagement part 12 on another side thereof. The engagement part 12 comprises a slide groove 13. In the embodiment, the slide groove 13 comprises two blockers 14 on two sides of the inner edge thereof. The clamp body 10 comprises two slide blocks 15 on one side thereof corresponding to the two blockers 14. Also, the clamp body 10 comprises a combination concave edge 16 arranged away from the first clamp part 11. The combination concave edge 16 is concavely formed on the engagement part 12, and comprises two recesses 17 toward the first clamp part 11.

The first handle 20 comprises a first handgrip part 21 on one end thereof, and a second clamp part 22 on another end thereof. A connection part 23 is disposed between the first handgrip part 21 and the second clamp part 22. The connection part 23 comprises an adjustment tooth 24 and an elongate movement groove 25. The connection part 23 is combined with the slide groove 13 of the clamp body 10 and slidable with respect to the slide groove 13, such that the first clamp part 11 and the second clamp part 22 are allowed to open and close with respect to each other for receiving a to-be-driven member, such as a screw member. In the embodiment, the first handle 20 comprises a first face **20*a* and a second face 20*b*, with the movement groove 25 passing through the first face 20*a* and the second face 20*b*. Also, each of the first face 20*a* and the second face 20*b* comprises a concave guiding groove 26, and the two guiding grooves 26 are disposed along the movement groove 25 and connected with the movement groove 25. Therein, the slide blocks 15 of the clamp body 10 are slidably disposed in the two guiding grooves 26, so as to provide a stable guiding effect when the first handle 20 and the clamp body 10** slide with respect to each other.

Also, the adjustment tooth 24 is arranged on two sides of the movement groove 25 and disposed on the first face **20*a*. The two blockers 14 of the clamp body 10 are slidably disposed in the movement groove 25, so as to limit the maximum opening distance between the first clamp part 11 and the second clamp part 22**.

The second handle 30 comprises a second handgrip part 31 on one end thereof, and a combination part 32 on another end thereof. The combination part 32 of the second handle 30 comprises two side plates 321, with a containing groove 322 disposed between the two side plates 321. The containing groove 322 is combined with the connection part 23 of the first handle 20, allowing the second handle 30 to be linked with the clamp body 10. Therefore, the second handle 30 is able to slide or pivot with respect to the first handle 20, whereby the first clamp part 11 and the second clamp part 22 move with respect to each other. In the embodiment, each side plate 321 comprises a through hole 323 connected with the containing groove 322.

The combination part 32 of the second handle 30 further comprises two protrusion parts 324 corresponding to the two recesses 17 of the clamp body 10, such that the outer profile of the combination part 32 of the second handle 30 corresponds to the combination concave edge 16 of the clamp body 10, whereby the two protrusion parts 324 rotatably abut against the two recesses 17. Therefore, when the second handle 30 slides or pivots with respect to the first handle 20, the protrusion parts 324 correspondingly control the clamp body 10 to slide with respect to the first handle 20, such that the first clamp part 11 and the second clamp part 22 are allowed to clamp the to-be-driven member.

Figure 4:
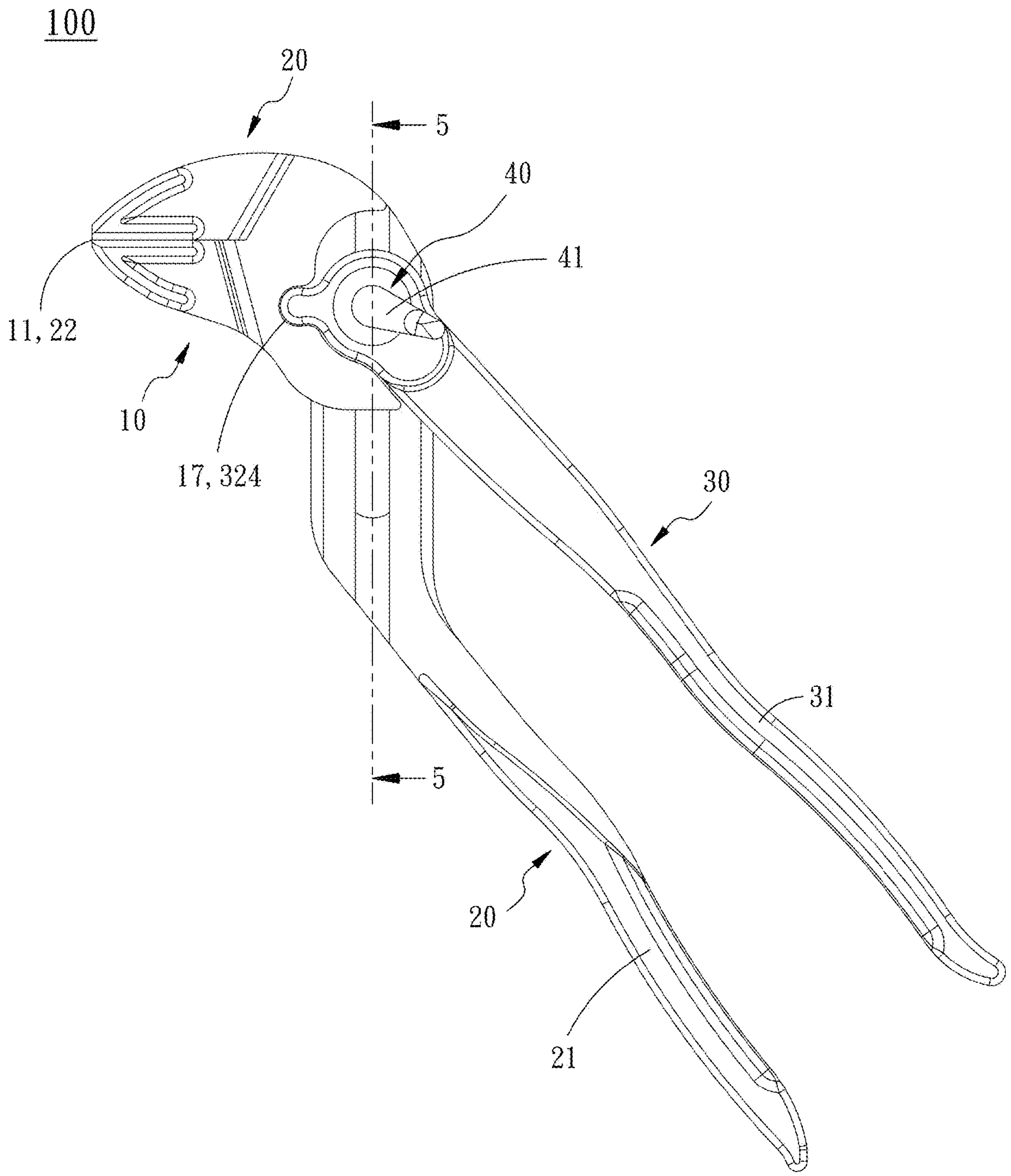
FIG. 4 is a front view of the adjustable pliers with lever type positioning device in accordance with an embodiment of the present invention, illustrating the lever member at the locked position.
Figure 6:
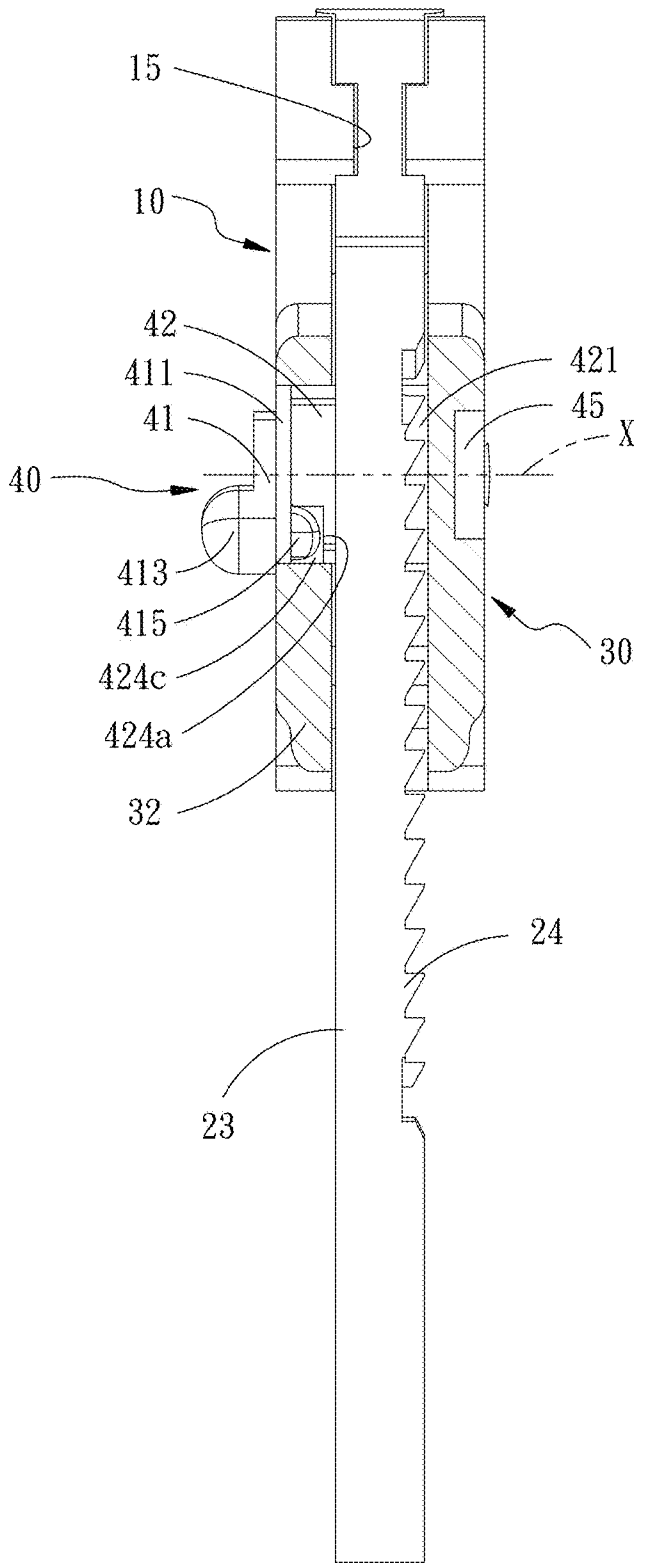
FIG. 6 is a sectional view of the adjustable pliers with lever type positioning device in accordance with an embodiment of the present invention, illustrating the controlling block corresponding to the lower level of the positioning member, and the positioning tooth engaged with the adjustment tooth.
Figure 7:
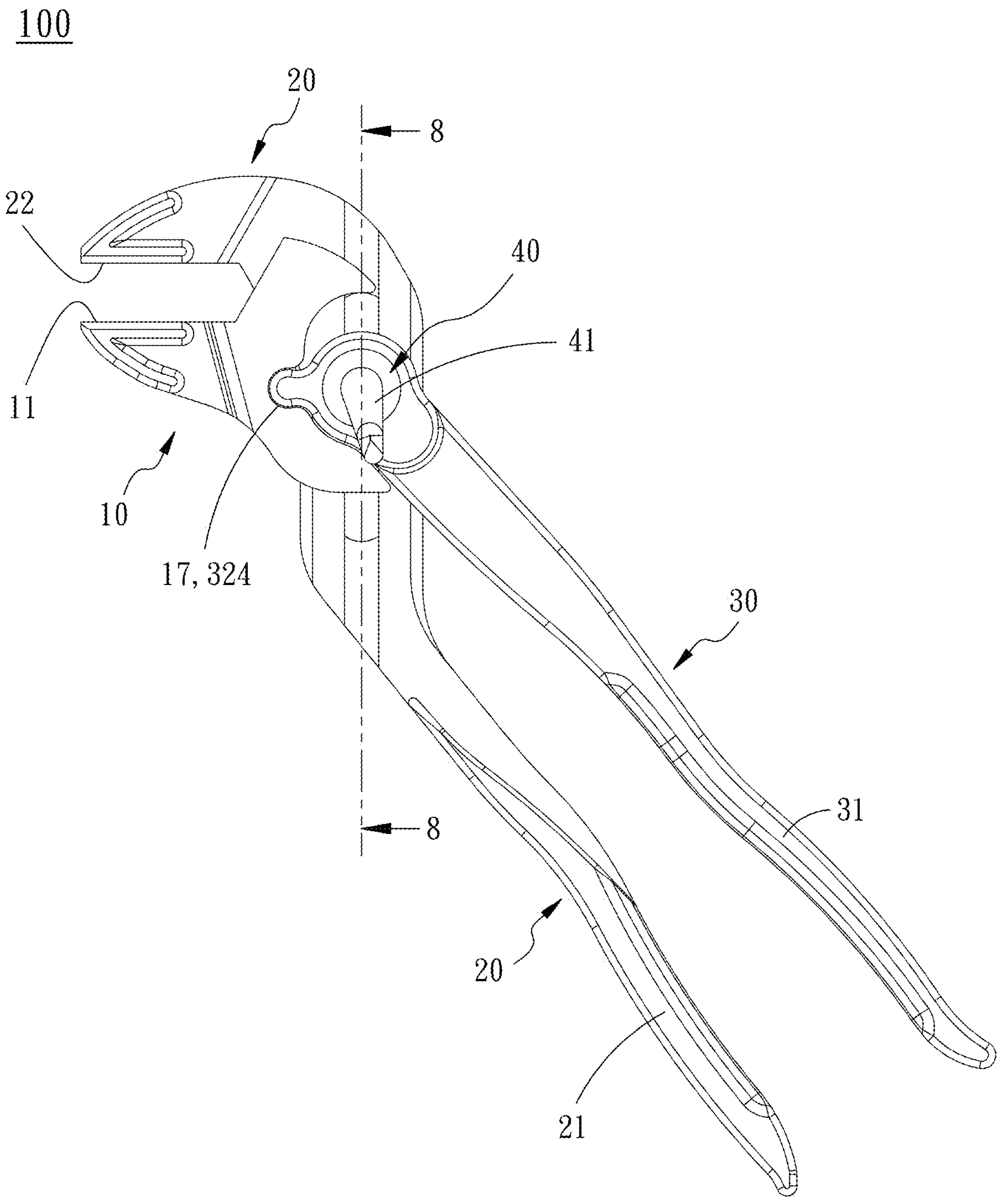
FIG. 7 is a front view of the adjustable pliers with lever type positioning device in accordance with an embodiment of the present invention, illustrating the lever member at the release position.
Figure 9:
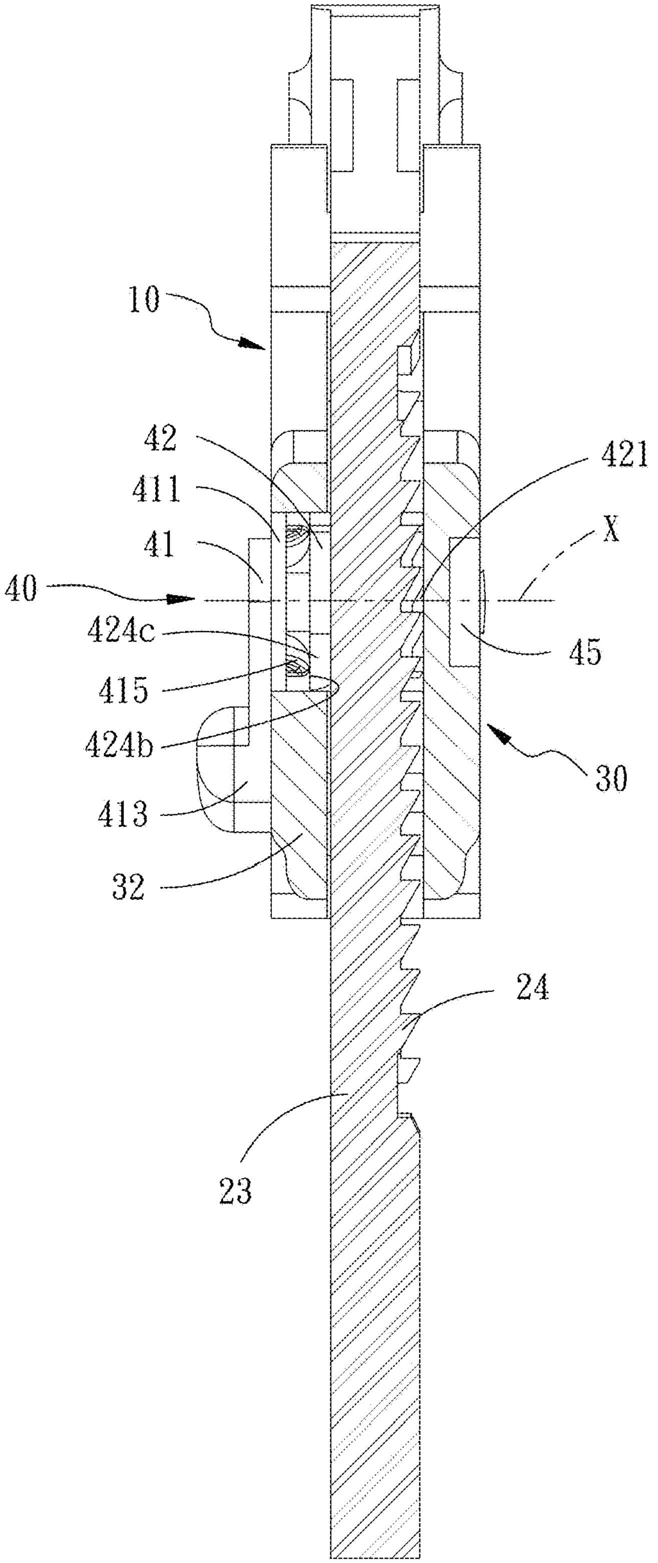
FIG. 9 is a sectional view of the adjustable pliers with lever type positioning device in accordance with an embodiment of the present invention, illustrating the controlling block corresponding to the higher level of the positioning member, and the positioning tooth disengaged from the adjustment tooth.

The lever positioning device 40 pivotally assembles the combination part 32 of the second handle 30 with the connection part 23 of the first handle 20 along a pivot axis X. The lever positioning device 40 comprises a lever member 41, a positioning member 42, an elastic member 43, a position limiting member 44, and a bottom cover 45. The lever member 41 is disposed in the movement groove 25, and rotates about the pivot axis X with respect to the first handle 20 between a locked position and a release position. The positioning member 42 is combined with the lever member 41 and comprises a positioning tooth 421. At the locked position, the positioning tooth 421 of the positioning member 42 is kept engaged with the adjustment tooth 24 (as shown by FIG. 4 and FIG. 6). At the release position, the lever member 41 actuates the positioning member 42 to move along the pivot axis X, so that the positioning tooth 421 is disengaged from the adjustment tooth 24 (as shown by FIG. 7 and FIG. 9), whereby the opening degree between the first clamp part 11 and the second clamp part 22 is adjusted.

In the embodiment, the lever member 41 comprises a rotary disc 411. The rotary disc 411 comprises a rotation shaft 412, and a lever handle 413 transversely extends from the rotary disc 411. The rotation shaft 412 comprises a thread 414. Two controlling blocks 415 are disposed on two sides of the rotation shaft 412, wherein the two controlling blocks 415 are disposed on the bottom face of the rotary disc 411. Also, each controlling block 415 comprises an arc face 416 on one side thereof.

The positioning member 42 passes through the movement groove 25 to be mounted around the rotation shaft 412 and arranged between the two side plates 321. The length of the rotation shaft 412 is larger than the length of the positioning member 42, so that the rotation shaft 412 passes through the positioning member 42. The positioning member 42 comprises a body part 422, which has an axle bore 423 combined with the rotation shaft 412. The positioning member 42 comprises two operation parts 424 disposed on one end of the body part 422 corresponding to the two controlling blocks 415 of the lever member 41. The positioning tooth 421 is disposed on the body part 422 and arranged away from the two operation parts 424. Each operation part 424 comprises a lower level **424*a*, a higher level 424*b*, and a bevel 424*c* connected between the lower level 424*a* and the higher level 424*b* along the direction of the pivot axis X. The distance from the lower level 424*a* to the positioning tooth 421 is smaller than the distance from the higher level 424*b* to the positioning tooth 421. The higher level 424*b* is a plane. At the locked position, the two controlling blocks 415 correspond to the two lower levels 424*a*, so as to maintain the engagement of the positioning tooth 421 and the adjustment tooth 24. When the lever member 41 moves from the locked position to the release position, along with the turning of the lever member 41, the two controlling blocks 415 abut against the two bevels 424*c* and move to the two higher levels 424*b* along the two bevels 424*c*, so that the two controlling blocks 415 push the positioning member 42 to move on the pivot axis X, whereby the positioning tooth 421 is disengaged from the adjustment tooth 24**.

The elastic member 43 is a compression spring. The elastic member 43 is mounted around the rotation shaft 412, and permanently abuts against the positioning member 42 to keep the positioning member 42 at the locked position (as shown by FIG. 5).

The position limiting member 44 comprises a non-circular bore 441 and is mounted around the positioning member 42. The outer profile of the positioning member 42 corresponds to the non-circular bore 411 for limiting the positioning member 42 from rotating with respect to the pivot axis X. In the embodiment, when the position limiting member 44 is combined with the positioning member 42, the operation parts 424 of the positioning member 42 correspond to two ends of the inner edge of the non-circular bore 441, and the two controlling blocks 415 of the lever member 41 also correspond to this position. When the lever member 41 is turned for adjustment, the controlling blocks 415 are limited to move only within the range of the inner edge end angle of the non-circular bore 441, so as to prevent the lever member 41 from excess rotation.

The bottom cover 45 is connected with the rotation shaft 412 of the lever member 41. In the embodiment, the bottom cover 45 comprises a screw bore 451 to be screwed to the thread 414 of the rotation shaft 412. The elastic member 43 is disposed between the positioning member 42 and the bottom cover 45, so that the elastic member 43 pushes the positioning member 42 toward the rotary disc 411 of the lever member 41. Therein, the bottom cover 45 is disposed in one of the through holes 323, with the position limiting member 44 disposed in the other through hole 323. Also, as shown by the drawings, the rotary disc 411 and the position limiting member 44 are in the through hole 323 arranged on the second face 20*b*, and the bottom cover 45 is disposed in the through hole 323 arranged on the first face 20*a*. In the embodiment, the rotation shaft 412 also passes through the bottom cover 45, such that the distal end of the rotation shaft 412 is exposed therefrom and flattened, such that the bottom cover 45 is combined with the rotation shaft 412 and provided with an anti-detachment effect. Further, the bottom cover 45 comprises two adjustment bores 452 disposed on two sides of the screw bore 451, into which a tool is inserted for adjusting the distance from the bottom cover 45 to the positioning member 42, such that the abutting force imposed by the elastic member 43 on the positioning member 42 is able to be finely tuned, thereby assuring the engagement between the positioning tooth 421 and the adjustment tooth 24.

Figure 2:
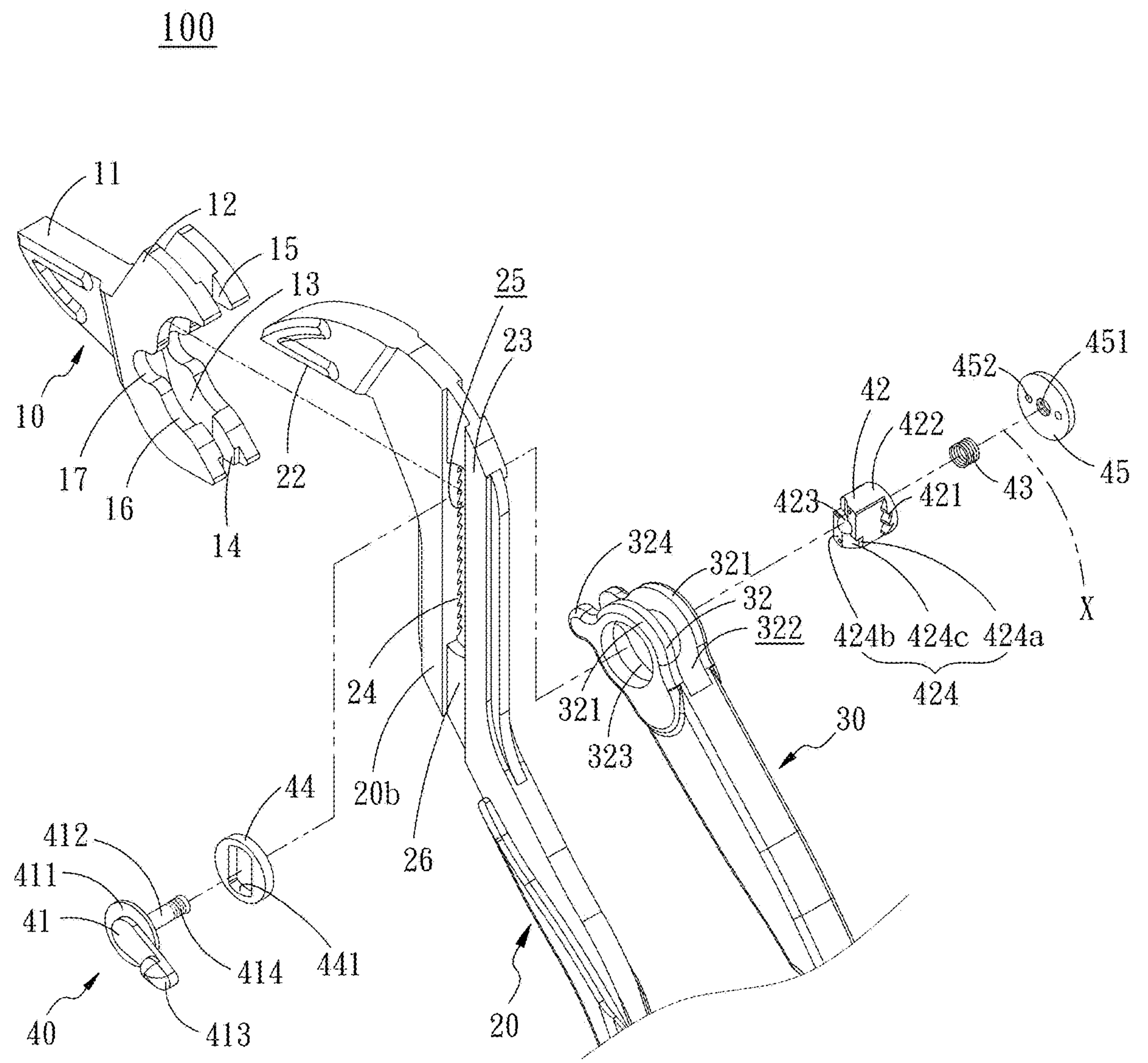
FIG. 2 is an exploded view of the adjustable pliers with lever type positioning device in accordance with an embodiment of the present invention.
Figure 3:
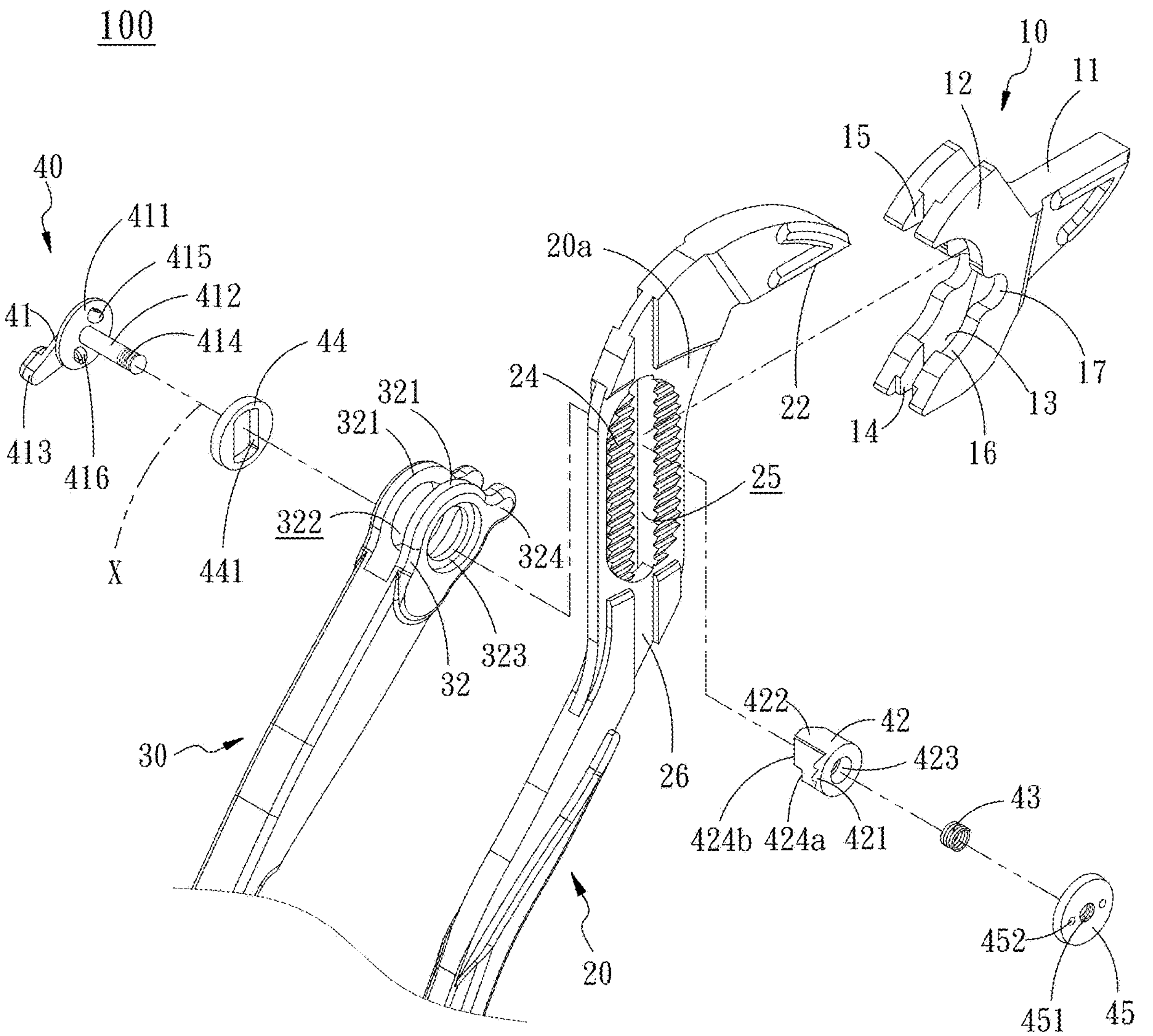
FIG. 3 is an exploded view from another viewpoint of the adjustable pliers with lever type positioning device in accordance with an embodiment of the present invention.
Figure 5:
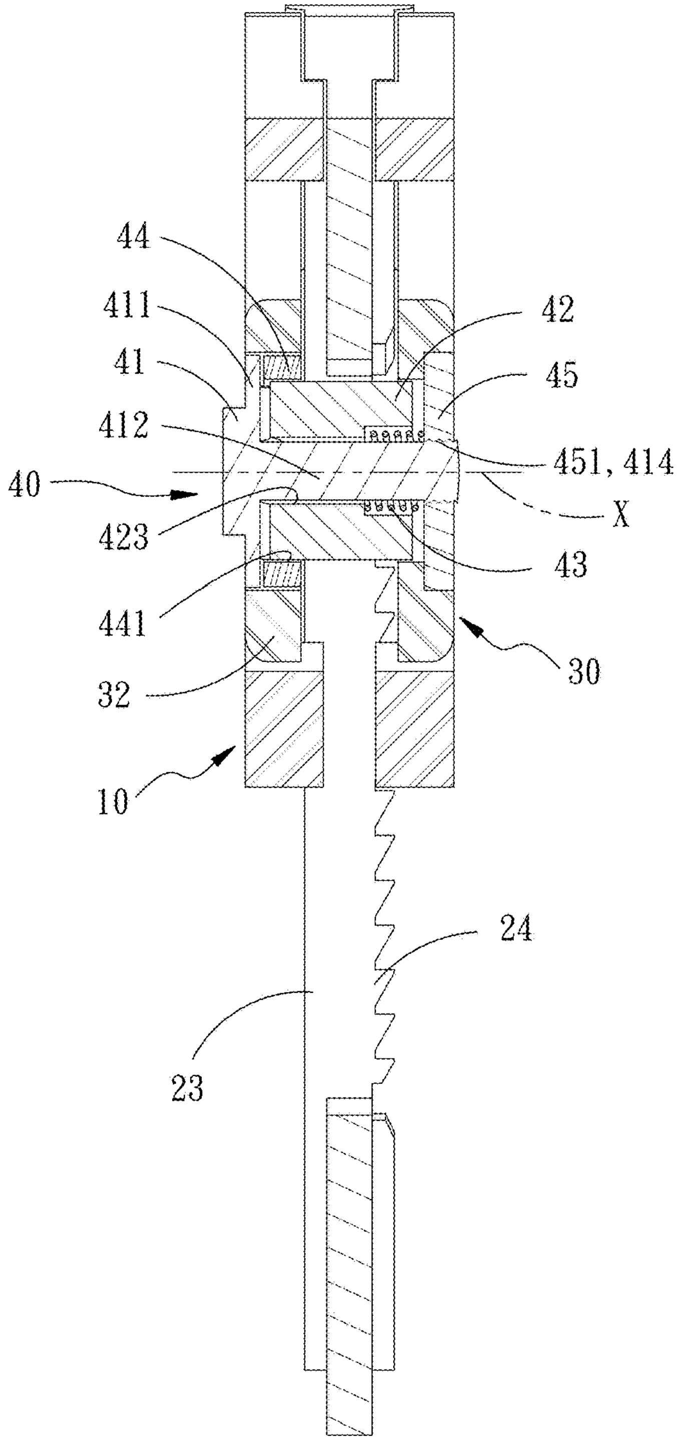
FIG. 5 is a cross-sectional view taken along line 5-5 in FIG. 4, illustrating the elastic member being kept in the pushing status.

Referring to FIG. 4 to FIG. 6 in view of FIG. 2 and FIG. 3, the lever member 41 is at the locked position. At this position, the elastic member 43 pushes the positioning member 42 toward the direction of the rotary disc 411, and the controlling blocks 415 of the lever member 41 correspond to the lower level 424*a*. The positioning tooth 421 is engaged with the adjustment tooth 24, so that the first clamp part 11 of the clamp body 10 is unable to be adjusted with respect to the second clamp part 22 of the first handle 20. Therefore, the first clamp part 11 and the second clamp part 22 are in the closing status.

Figure 8:
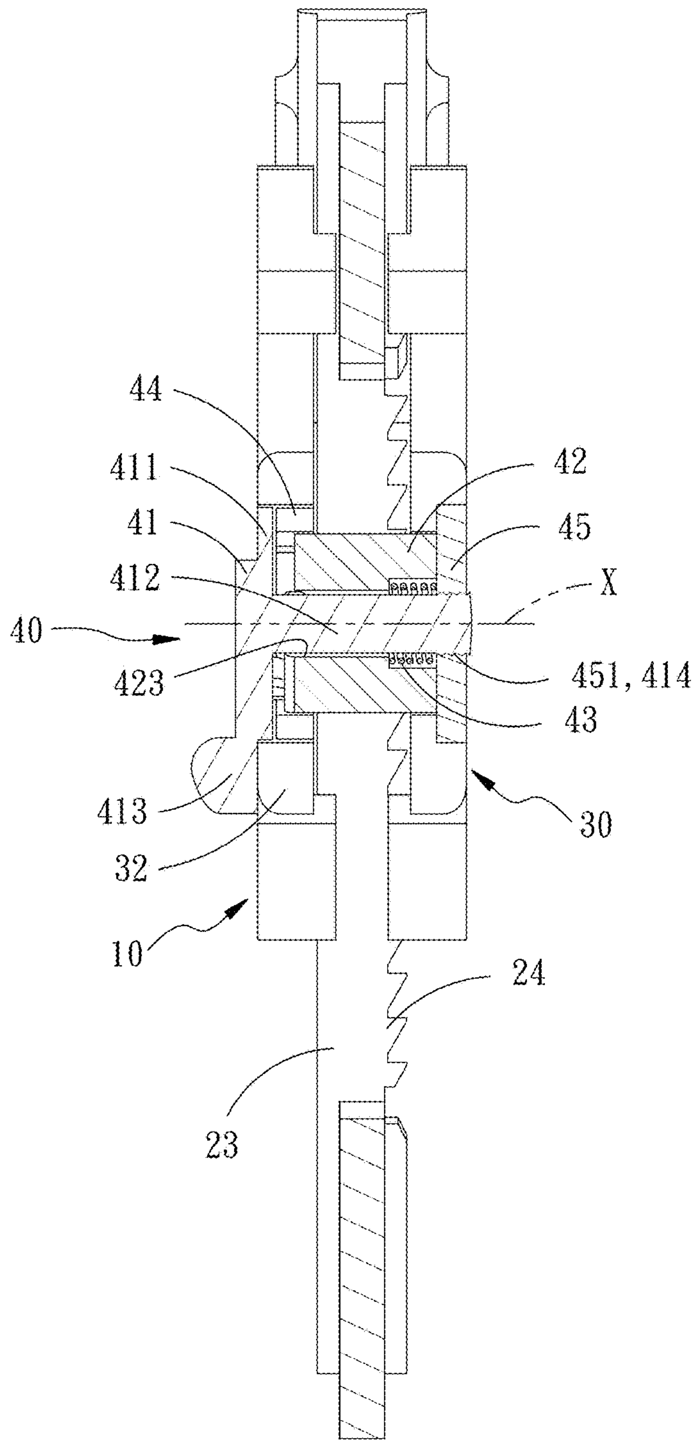
FIG. 8 is a cross-sectional view taken along line 8-8 in FIG. 7, illustrating the elastic member in the compressed status.

Referring to FIG. 7 to FIG. 9 in view of FIG. 2 and FIG. 3, when the user turns the lever handle 413 of the lever member 41 clockwise from the locked position to the release position, the controlling blocks 415 of the lever member 41 move to the two higher levels 424*b* along the two bevels 424*c*, so that the positioning member 42 is pushed along the pivot axis X, whereby the positioning tooth 421 is disengaged from the adjustment tooth 24 (the elastic member being in the compressed status, as shown by FIG. 8). Therefore, the user applies the second handle 30 to actuate the clamp body 10 to slide with respect to the first handle 20, whereby the opening distance between the first clamp part 11 and the second clamp part 22 is adjusted. When the user changes the lever member 41 to the release position, because the positioning member 42 is pushed toward the bottom cover 45 by the lever member 41, the positioning member 421 is kept disengaged from the adjustment tooth 24, so that the user is able to freely adjust the opening distance between the first clamp part 11 and the second clamp part 22, without the need of keeping the finger on the lever member 41 or keeping the hand in a pressing status as when using the conventional pliers. On the other hand, when the adjustment is completed, the user only needs to turn the lever member 41 counterclockwise back to the locked position, and the positioning member 42 is pushed by the elastic member 43 back to the original position, such that the positioning tooth 421 is again engaged with the adjustment tooth 24, so as to accordingly fix the needed opening degree between the first clamp part 11 and the second clamp part 22.

With the foregoing configuration of the present invention, when the lever member 41 is turned, the user is able to adjust the opening distance between the first clamp part 11 and the second clamp part 22, without the need of keeping the hand on the lever member 41. After the adjustment, the user only needs to turn the lever member 41 back to the locked position, so as to fix the needed opening distance between the first clamp part 11 and the second clamp part 22. Therefore, the convenience of usage is facilitated. Also, the user is prevented from having hand discomfort due to continuously pressing of the conventional pipe pliers.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pair of adjustable pliers with lever type positioning device, comprising:

a clamp body comprising a first clamp part on one side thereof and a slide groove on another side thereof;

a first handle comprising a first handgrip part on one end thereof and a second clamp part on another end thereof, a connection part disposed between the first handgrip part and the second clamp part, the connection part comprising an adjustment tooth and a movement groove, the connection part combined with the slide groove and slidable with respect to the slide groove, so that the first clamp part and the second clamp part open and close with respect to each other;

a second handle comprising a second handgrip part on one end thereof and a combination part on another end thereof; and a lever type positioning device pivotally connect the combination part of the second handle with the connection part along a pivot axis, so that the second handle being linked with the clamp body; the lever type positioning device comprising a lever member and a positioning member, the lever member comprises a rotation shaft, and the positioning member is mounted around the rotation shaft; two controlling blocks are disposed on two side of the rotation shaft, and the positioning member comprises two operation parts corresponding to the two controlling blocks; each operation part comprises a lower level, a higher level, and a bevel connected between the lower level and the higher lever along the pivot axis, the lever member disposed in the movement groove and rotatable about the pivot axis with respect to the first handle between a locked position and a release position, the positioning member comprising a positioning tooth; when the lever member is at the locked position, the two controlling blocks correspond to the two lower levels, the positioning tooth of the positioning member is kept engaged with the adjustment tooth; when the lever member is changed from the locked position to the release position, the two controlling blocks abut against the two bevels and move to the two higher levels along the two bevels, whereby the two controlling blocks push the positioning member to move along the pivot axis, the lever member actuates the positioning member to move along the pivot axis, such that the positioning tooth is disengaged from the adjustment tooth, facilitating an adjustment of an opening degree between the first clamp part and the second clamp part.

2. The adjustable pliers with lever type positioning device of claim 1, wherein the lever type positioning device comprises an elastic member; the elastic member is mounted around the rotation shaft and permanently abuts against the positioning member to keep the positioning member at the locked position.

3. The adjustable pliers with lever type positioning device of claim 2, wherein each of the two controlling blocks comprises an arc face on one side thereof; the positioning member comprises a body part, and the body part comprises an axle bore combined with the rotation shaft; the two operation parts are disposed on one end of the body part, the positioning tooth is disposed on the body part and arranged away from the two operation parts, and a distance from the two lower levels to the positioning tooth is smaller than a distance between the two higher levels to the positioning tooth; the lever type positioning device further comprises a bottom cover which is screwed to the rotation shaft of the lever member, and the elastic member is disposed between the positioning member and the bottom cover.

4. The adjustable pliers with lever type positioning device of claim 3, wherein the combination part of the second handle comprises two side plates, with a containing groove disposed between the two side plates and combined with the connection part; each of the two side plates comprises a through hole passing through the containing groove, wherein the bottom cover is disposed in one of the two through holes, and the lever type positioning device further comprises a positioning limiting member disposed in the other through hole; the position limiting member limits the positioning member from rotate with respect to the pivot axis.

5. The adjustable pliers with lever type positioning device of claim 4, wherein the position limiting member comprises a non-circular bore, and an outer profile of the positioning member corresponds to the non-circular bore.

6. The adjustable pliers with lever type positioning device of claim 4, wherein the adjustment tooth is disposed on two sides of the movement groove; the slide groove of the clamp body comprises two blockers on two sides of the inner edge thereof, and the two blockers are slidably disposed in the movement groove.

7. The adjustable pliers with lever type positioning device of claim 6, wherein the first handle comprises a first face and a second face, and the movement groove passes through the first face and the second face; each of the first face and the second face comprises a concave guiding groove, and the two guiding grooves are disposed along the movement groove and connected with the movement groove; the clamp body comprises two slide blocks on one side thereof corresponding to the two blockers, and the two slide blocks are slidably disposed in the two guiding grooves.

8. The adjustable pliers with lever type positioning device of claim 7, wherein the clamp body comprises a combination concave edge arranged away from the first clamp part corresponding to the outer profile of the combination part; the combination concave edge comprises two recesses toward the first clamp part, and the combination part of the second handle comprises two protrusion parts corresponding to the two recesses; the two protrusion parts rotatably abut against the two recesses.

9. The adjustable pliers with lever type positioning device of claim 8, wherein the lever member comprises a rotary disc; the rotation shaft is disposed on the rotary disc, and a lever handle transversely extends from the rotary disc; the adjustment tooth is disposed on the first face; the rotary disc and the positioning limiting member are disposed in the through hole arranged on the second face, and the bottom cover is disposed in the other through hole arranged on the first face.

* * * * *